Aug. 30, 1932.   M. W. McCONKEY ET AL   1,875,082
BRAKE
Filed Jan. 11, 1930
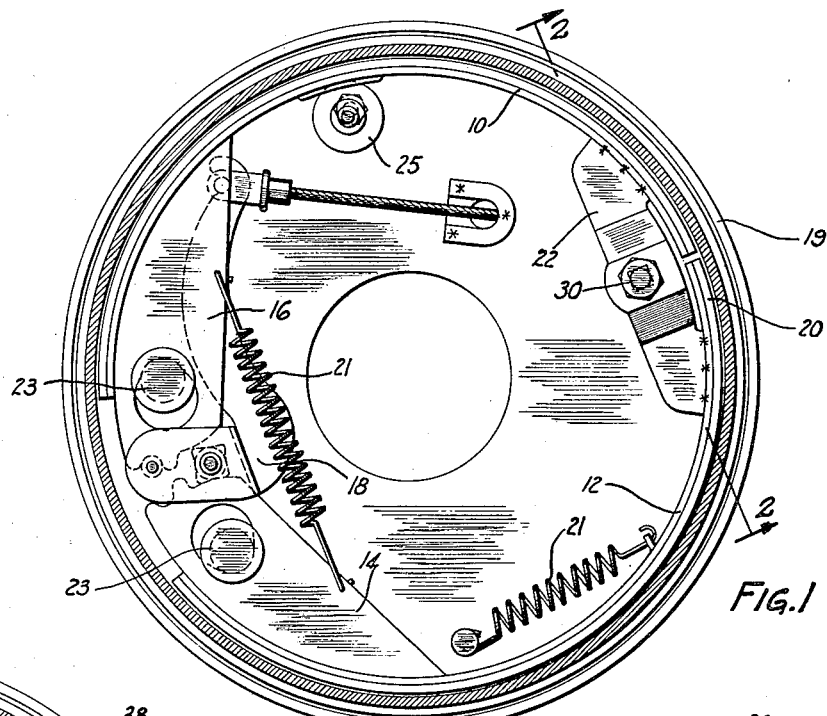
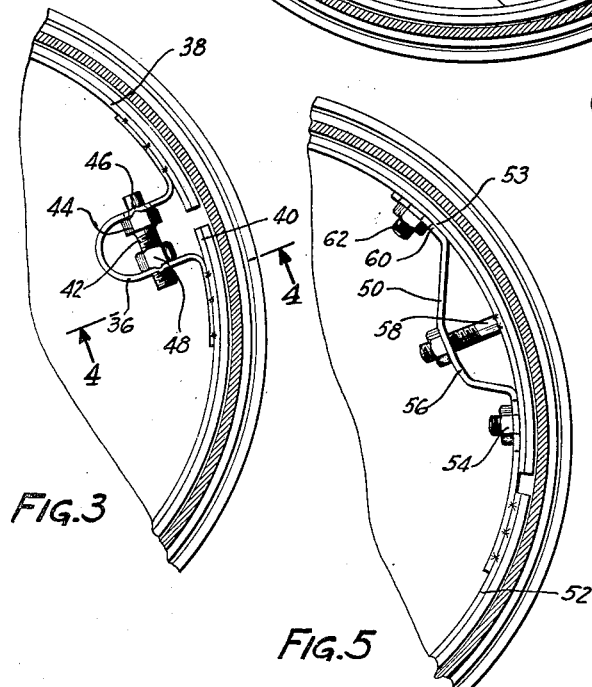
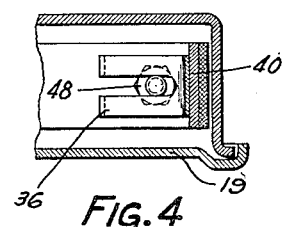
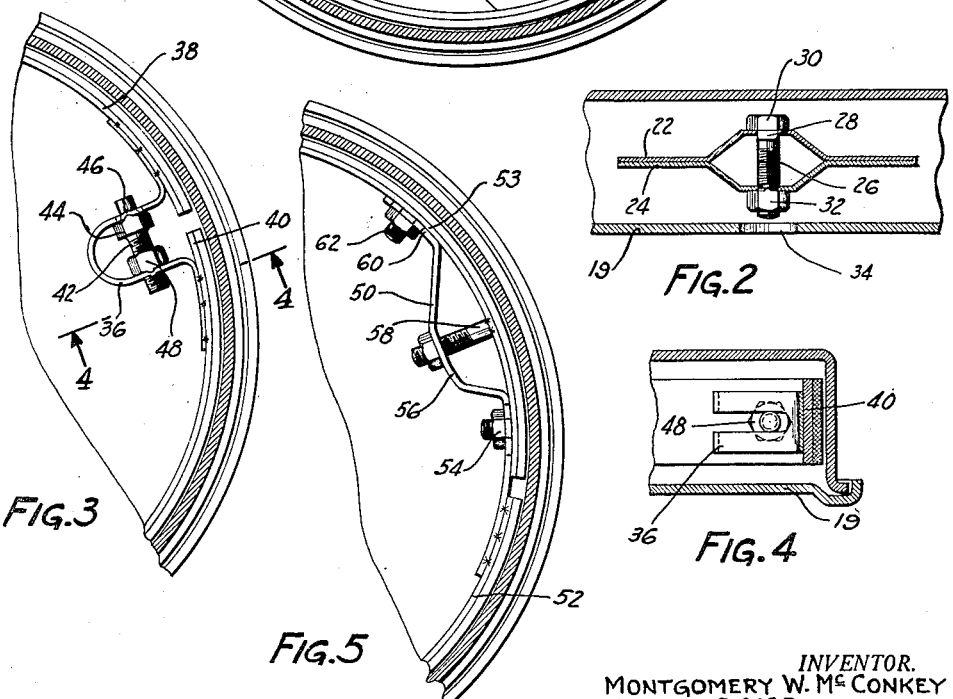
INVENTOR.
MONTGOMERY W. McCONKEY
EUGENE G. McDONALD
BY
H. Q. Clayton
ATTORNEY Patented Aug. 30, 1932

1,875,082

UNITED STATES PATENT OFFICE

MONTGOMERY W. McCONKEY AND EUGENE G. McDONALD, OF SOUTH BEND, INDIANA, ASSIGNORS TO BENDIX BRAKE COMPANY, OF SOUTH BEND, INDIANA, A CORPORATION OF ILLINOIS

BRAKE

Application filed January 11, 1930. Serial No. 420,033.

This application relates to brakes in general and more particularly to automotive brakes of the internal expanding band type.

In brakes of this type it is often found difficult to adjust the band to compensate for lining wear. To the end that adjustment may be made with facility the invention contemplates a structure wherein manipulation of a single means such as a nut effects an increase in the overall length of the band through the intermediation of means integrally or otherwise rigidly secured to adjacent split portions of the band.

In the illustrated embodiments of the invention spaced apart sections are secured together by an expansible striplike member, which may be placed under compression by a single means to separate the ends of said sections to effect the desired adjustment.

Further features of the invention, include details of construction and combinations of parts which will become apparent from the hereinafter described preferred embodiments of the invention disclosed in the accompanying drawing, in which:

Figure 1 is a side elevation of a brake with one form of adjusting means incorporated therein;

Figure 2 is a transverse section through the adjustment of Figure 1 substantially on the line 2—2 thereof;

Figure 3 discloses a modified form of adjustment of the band sections;

Figure 4 is a cross section through the band of Figure 3 substantially on the line 4—4, disclosing the joint in side elevation; and Figure 5 illustrates a further modified form of expansible joint.

In Figure 1 of the drawing, we have shown one form of our adjustment incorporated in a two-sectioned band type internal expanding brake, said sections, namely 10 and 12 being reinforced at their ends by web members 14 and 16. Interposed between spaced apart ends of the band there is inserted a bell crank lever floating applying means 18, which is cable actuated. This actuating means forms no part of our invention, it is that of Ludger E. LaBrie and Adolph Rosner, covered by application Serial No. 391,714, filed September 11, 1929. The entire brake mechanism is supported by the usual plate 19 which also encloses and protects the structure.

In operation, actuation of the lever 18 serves to spread the ends of the band into drum contact, against the resistance of the springs 21. Depending upon the direction of drum rotation, one or the other of the webs 14 or 16 on the ends of the band anchor on one or the other of anchor posts 23 passing through slots in the webs. An eccentrically mounted disk stop member 25 serves to determine the idle or inoperative position of the band.

As the lining material 20 of the band sections becomes worn, it is necessary to compensate for the wear by increasing the overall length of the band sections to maintain a substantially unvariable lining clearance when the band is in released position. To this end we have provided an expansible joint for the band sections. The joint in one form is shown in section in Figure 2 and in elevation in Figure 1. This adjusting means preferably comprises parallel contiguous stampings 22 and 24 extending substantially in the plane of the brake, that is, radially of the band, which stampings are preferably rigidly secured at their offset ends, preferably by welding, to the inner face of the respective band sections 10 and 12. Intermediate their ends and preferably in a radial line extending through the space between the band sections the stampings are offset diagonally outwardly and inwardly respectively and thence extended in parallel relation to form a substantially boxlike opening, as clearly disclosed in Figure 2. A bolt member 26 is preferably keyed or otherwise non-rotatably secured at 28 to one of the parallel spaced apart portions, this bolt having a head 30 extending transversely through said parallel portions and threadedly receiving a nut 32.

In order to effect the desired separation of the band ends, it is merely necessary to tighten up on the nut 32 accessible through an opening 34 in the plate 19 which tightening effects a separation of the band sections through the intermediary of the compressive strains placed upon the sides and ends of the stampings 22 and 24.

We have disclosed in Figures 3 and 4 a second form of expansible joint comprising a fairly rigid steel stamping 36 rigidly secured preferably, though not necessarily, by being welded to the inner face of the proximate ends of the band sections 38 and 40, said stamping intermediate its ends, and substantially in a radial line extending between the band sections, being bent into U-shape form. The U-shaped radially extending projection is preferably slotted intermediate its sides to receive at the base of the slot the ends of a threaded bolt member 42, preferably provided with an integral hex head portion 44 keyed as by an embossed portion 46 received within a corresponding recess in the inner face of the U-portion of the stamping. The member 42 has threaded thereon a nut 48 provided with an embossed portion adapted to engage a recess in the stamping.

Adjustment of the band of Figure 3 is effected substantially in the same manner as is the mechanism of Figure 1, it being merely necessary to rotate the nut 48, which thus serves to spread apart the sides of the U-portion of the stamping to effect the desired separation of the ends of the band sections.

As disclosed in Figure 5, we have provided a third form of our invention, wherein a strap preferably a stamping 50, paralleling the inner faces of the band sections is rigidly secured, preferably by welding, to the end of one of the band sections 52. The strap 50 is thence extended across the gap between the ends of the band sections 52 and 53, being longitudinally slotted to receive a stud member 54 preferably welded or otherwise fixedly secured at its base to the end of the band section 53. The strap is thence extended radially inwardly to provide a bent or looped portion 56 orificed at its center to accommodate a relatively long radially extending threaded stud member 58 also rigidly secured at its base to the band section 53. The structure is completed by extending the stamping at 60, slotting the same to receive a stud member 62 similar to stud 54, the latter also integrally secured to the inner face of the band section.

Adjustment of the latter device is effected by loosening up of the nuts on the studs 54 and 62, whereupon the nut on the threaded stud 58 is screwed down, placing the stamping under compression and effecting relative movement or separation of the ends of the band sections by virtue of the integral connection of the strap with the ends thereof. After the desired adjustment or relative movement of the sections is effected, the nuts on the studs 54 and 62 are tightened down to securely preserve the adjustment. It is to be noted that the strap portion 50 is not subjected to the braking force or torque, the same being taken directly by the frictional binding action of stud parts 54. In other words, the torque is taken directly from the end of the band section 52 through the strap at its end and thence through the stud to the other band section 53.

It is submitted, therefore, that we have provided, in the embodiments disclosed, an extremely compact and simple, yet withal efficient adjusting means for a brake of this type wherein a stamping is placed under compression by means of an adjustable bolt to effect relative movement or separation of the band segments.

While several illustrative embodiments have been described in detail, it is not our intention to limit the scope of the invention to those particular embodiments or otherwise than by the terms of the appended claims.

We claim:

1. A brake comprising, in combination with a rotatable drum, an annular friction device adapted to be expanded into drum engagement, said device comprising a plurality of sections having secured thereto a flexible member expansible by means placing said member under compression, whereby the overall length of said device may be increased.

2. A brake comprising, in combination with a rotatable drum, an annular bandlike friction device adapted to be expanded into drum contact, said device comprising a plurality of sections having rigidly secured thereto a flexible member expansible by a bolt and nut means placing said member under compressive stress whereby the overall length of said device may be increased.

3. A brake comprising, in combination with a rotatable drum, an annular friction device adapted to be expanded into drum engagement, said device comprising a plurality of sections having secured thereto a flexible member expansibly distorted by means placing said member under compression whereby the overall length of said device may be increased.

4. A brake comprising, in combination, a rotatable drum, an annular bandlike friction device adapted to be expanded into drum contact, said device comprising a plurality of sections having a strap member secured to the proximate ends of said sections, together with means for placing said strap member under compression including a bolt member passing through said strap, said bolt threadedly receiving a nut contacting said strap.

5. A brake comprising, in combination with a rotatable drum, an annular friction device within said drum comprising spaced apart sections secured together by a strap member, said member comprising juxtaposed stampings extending in the plane of the brake, offset at their ends and secured thereto to the ends of the band sections, said stampings being provided intermediate their ends with a boxlike opening.

6. A brake comprising, in combination, a two-part friction device, said parts being secured together by a strap member rigidly secured at its ends to the ends of said first-mentioned parts to provide a one piece member, said strap member characterized by having a U-shaped bent portion intermediate its ends.

7. A brake comprising, in combination, a rotatable drum, a friction device within said drum, together with means for increasing the overall length of said device comprising a strap member arranged parallel with the inner face of said friction device, said strap member provided with a plurality of longitudinally extending slots to receive stud members rigidly secured to the inner face of said friction device.

8. A brake comprising a sectionalized friction element, a flexible element connecting the sections and means for placing the flexible element under compression.

9. A brake comprising a sectionalized friction element, a flexible element connecting the sections, means for placing the flexible element under compression and means for retaining the flexible element under compression.

10. A brake comprising a sectionalized friction element, a flexible element connecting the sections and means on the flexible element for placing the flexible element under compression.

11. A brake comprising a sectionalized friction element, a flexible element connecting the sections and means carried by the flexible element for expanding the friction element.

12. A brake comprising a sectionalized friction element, a flexible element connecting the sections and means on the friction element for compressing the flexible element.

In testimony whereof, we have hereunto signed our names.

MONTGOMERY W. McCONKEY.
EUGENE G. McDONALD.